(12) United States Patent
Tezuka

(10) Patent No.: US 10,410,099 B2
(45) Date of Patent: Sep. 10, 2019

(54) IMAGE FORMING APPARATUS THAT CONTROLS WHETHER TO EXECUTE IMAGE PROCESSING FOR A TARGET PIXEL BASED ON A CALCULATED AMOUNT OF CHANGE OF PIXEL VALUES, AND RELATED CONTROL METHOD AND STORAGE MEDIUM STORING A PROGRAM

(71) Applicant: CANON KABUSHIKI KAISHA, Tokyo (JP)

(72) Inventor: Taiki Tezuka, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 26 days.

(21) Appl. No.: 15/667,759

(22) Filed: Aug. 3, 2017

(65) Prior Publication Data
US 2018/0060711 A1    Mar. 1, 2018

(30) Foreign Application Priority Data
Aug. 25, 2016   (JP) ................................ 2016-165070

(51) Int. Cl.
| | |
|---|---|
| G06K 15/02 | (2006.01) |
| H04N 1/60 | (2006.01) |
| G03G 15/00 | (2006.01) |
| B41J 2/175 | (2006.01) |
| B41J 29/393 | (2006.01) |
| G06K 15/00 | (2006.01) |
| G06K 15/14 | (2006.01) |

(52) U.S. Cl.
CPC ...... *G06K 15/1878* (2013.01); *B41J 2/17566* (2013.01); *G03G 15/5025* (2013.01); *G03G 15/55* (2013.01); *H04N 1/605* (2013.01); *H04N 1/6022* (2013.01); *H04N 1/6027* (2013.01); *B41J 29/393* (2013.01); *B41J 2002/17569* (2013.01); *G03G 2215/00789* (2013.01); *G06K 15/007* (2013.01); *G06K 15/14* (2013.01)

(58) Field of Classification Search
CPC .. G06K 15/1878; G06K 15/007; G06K 15/14; B41J 2/17566; B41J 29/393; B41J 2002/17569; H04N 1/6022; H04N 1/6027; H04N 1/605; G03G 15/55; G03G 2215/00789; G03G 15/5025
USPC ........................................ 358/1.9, 1.15, 518
See application file for complete search history.

(56) References Cited

U.S. PATENT DOCUMENTS

| | | | | |
|---|---|---|---|---|
| 2005/0088673 | A1* | 4/2005 | Yokochi | .................... H04N 1/58 358/1.9 |
| 2006/0022996 | A1* | 2/2006 | Kondo | ................. H04N 1/6025 345/604 |

FOREIGN PATENT DOCUMENTS

JP      2012-205228 A    10/2012

* cited by examiner

*Primary Examiner* — Quang N Vo
(74) *Attorney, Agent, or Firm* — Venable LLP

(57) ABSTRACT

An image forming apparatus includes an image processing unit that executes, with respect to image data, image processing that adjusts an amount of a printing material to be applied to a printing medium, a calculation unit that calculates an amount of change of pixel values between a target pixel and a peripheral pixel that is adjacent to the target pixel, and a control unit that controls whether to execute the image processing for the target pixel based on the calculated amount of change of pixel values. In addition, a printing unit prints an image on the printing medium based on image data resulting from the control of execution of the image processing by the control unit.

10 Claims, 7 Drawing Sheets

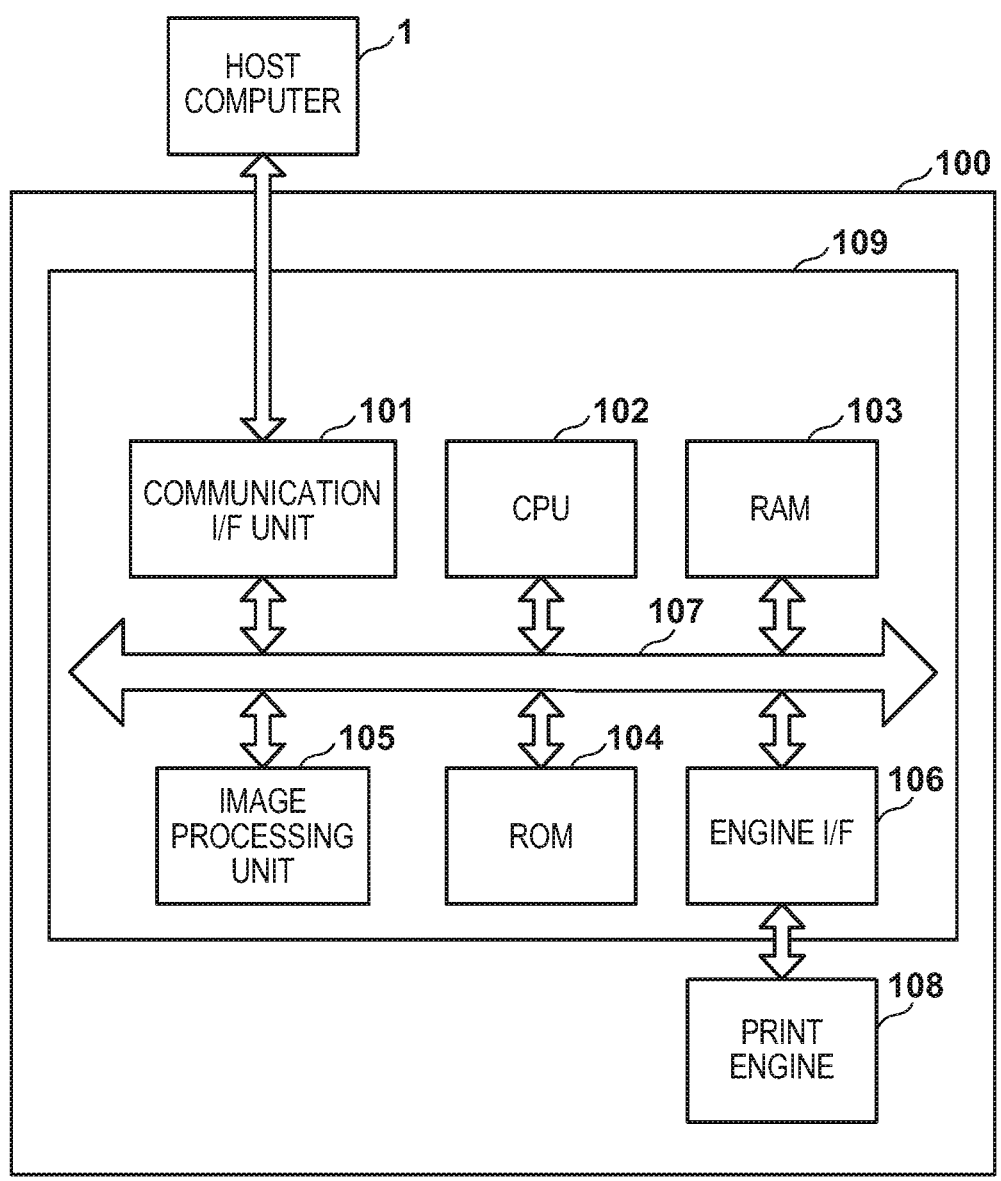
F I G. 1

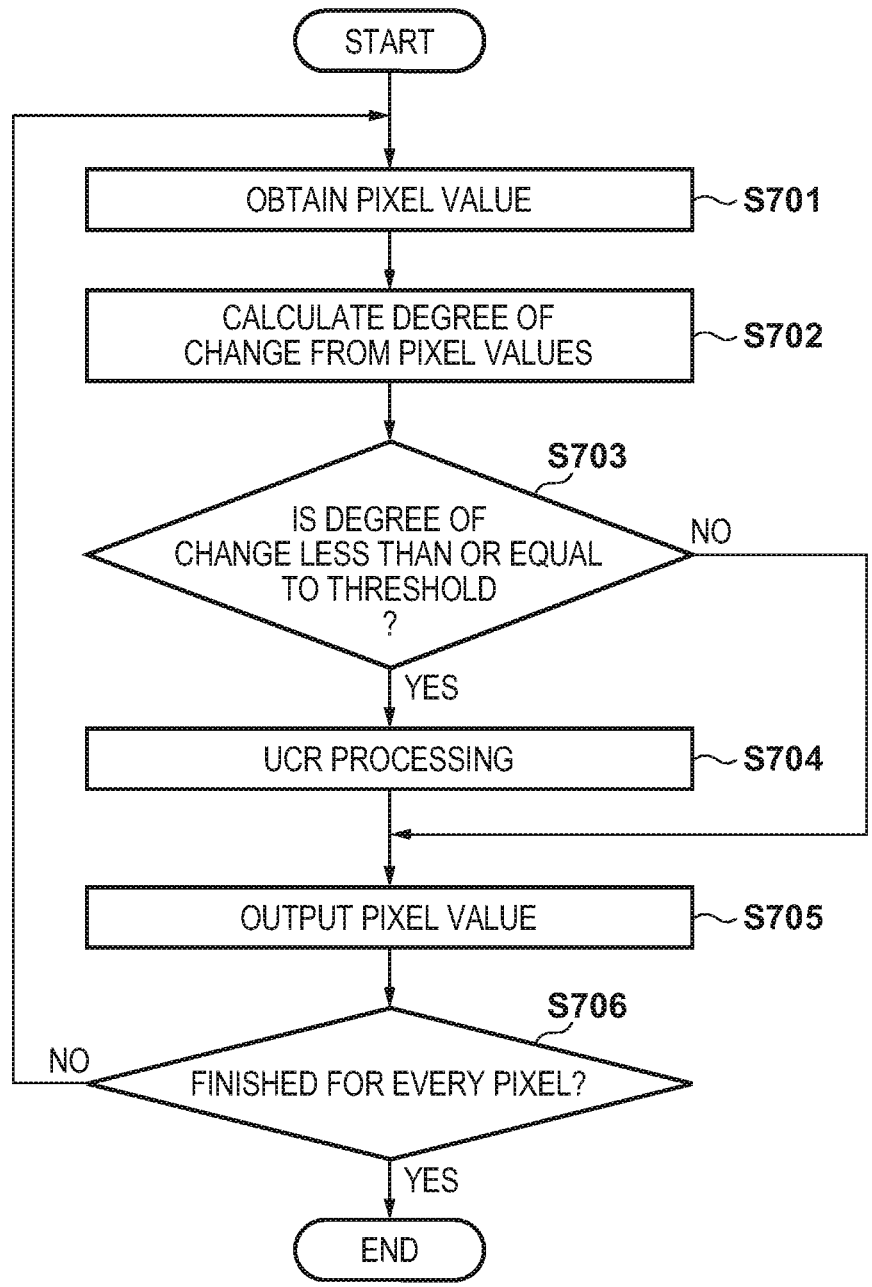

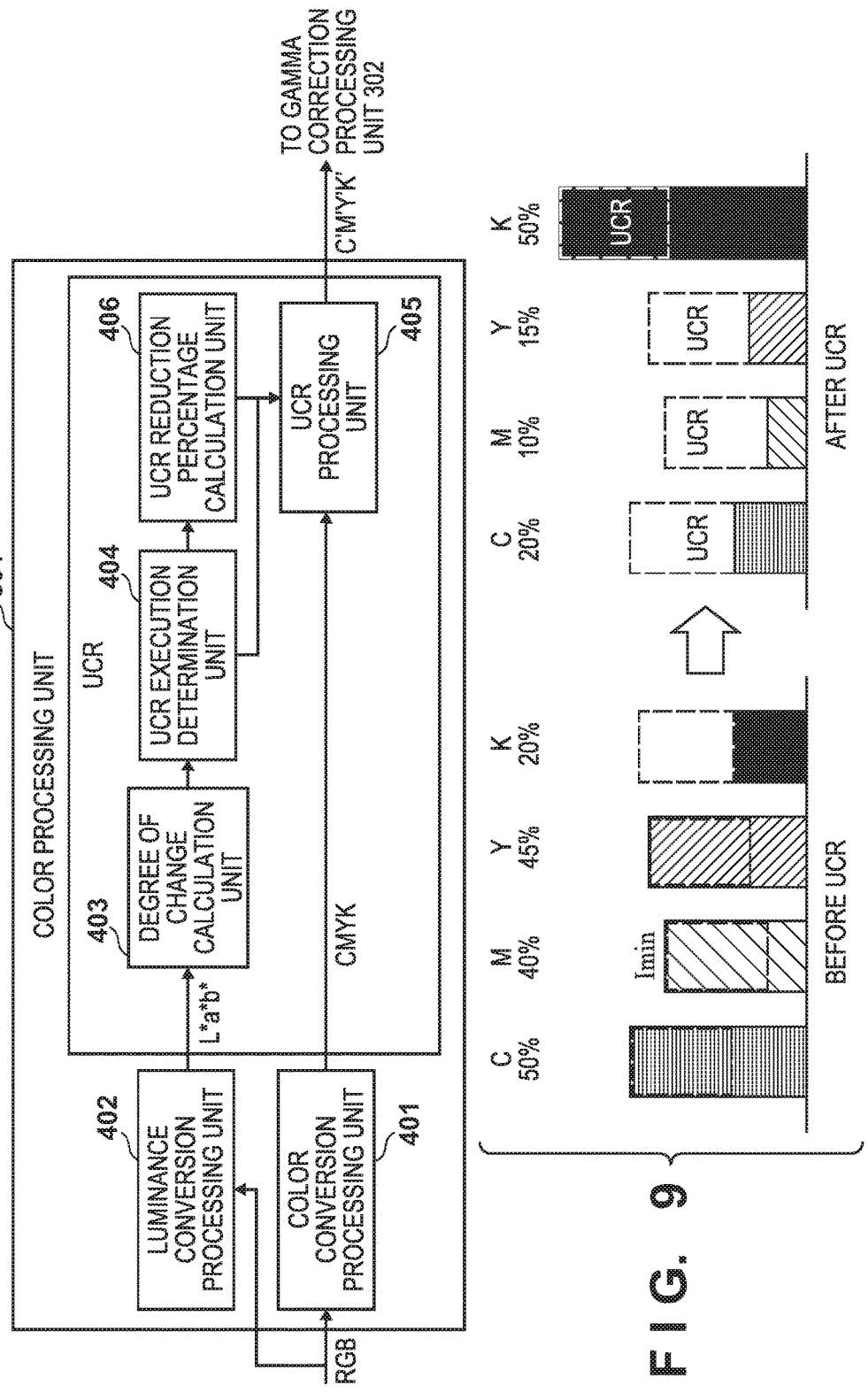

IMAGE FORMING APPARATUS THAT CONTROLS WHETHER TO EXECUTE IMAGE PROCESSING FOR A TARGET PIXEL BASED ON A CALCULATED AMOUNT OF CHANGE OF PIXEL VALUES, AND RELATED CONTROL METHOD AND STORAGE MEDIUM STORING A PROGRAM

This application claims the benefit of Japanese Patent Application No. 2016-165070, filed on Aug. 25, 2016, which is hereby incorporated by reference herein in its entirety.

BACKGROUND OF THE INVENTION

Field of the Invention

The present invention relates to an image forming apparatus for printing an image on a printing medium, a control method, and a storage medium storing a program.

Description of the Related Art

In image forming apparatuses that form color images, adjusting a usage amount of a printing material, such as toner or ink, in accordance with an image signal at a time of image formation is performed. In such image forming apparatuses, processing referred to as Under Color Remove (UCR) processing is often executed in order to reduce the total usage amount of the printing material. The UCR processing is processing for reducing the total amount of the printing material used at a time of image formation by reducing a yellow magenta cyan (YMC) component, and substituting in a black (K) component when an achromatic color image signal comprising four components of cyan magenta yellow black (CMYK) is output. In Japanese Patent Laid-Open No. 2012-205228, determining a reduction amount of the YMC component, and a substitution amount of the K component in accordance with a brightness or a saturation of pixels, which are a processing target, is recited.

When executing the UCR processing, however, there exist cases in which an amount of applied printing material on a printed document that is output becomes low, causing image quality to be reduced. Accordingly, conventionally, UCR processing was executed on only an image region, such as a graphic, and UCR processing could not be executed on an image region for which image quality is emphasized, such as a photograph.

SUMMARY OF THE INVENTION

An object of the present invention is to eliminate the above-mentioned problems with the conventional technology. To realize maintenance of image quality as well as a reduction of a printing material, the present invention provides an image forming apparatus for appropriately executing image processing for adjusting an amount of printing material applied to a printing medium, a control method, and a storage medium storing a program.

In one aspect, the present invention provides an image forming apparatus for printing an image on a printing medium based on image data, the apparatus comprising an image processing unit configured to execute, with respect to image data, image processing that adjusts an amount of printing material applied to the printing medium, a control unit configured to control execution of the image processing based on an amount of change of pixel values of the image data, and a printing unit configured to print an image on the printing medium based on image data resulting from the control of execution of the image processing by the control unit.

According to the present invention, it is possible to appropriately execute image processing for adjusting an amount of printing material applied to a printing medium so as to realize maintenance of image quality as well as a reduction of a printing material.

Further features of the present invention will become apparent from the following description of exemplary embodiments with reference to the attached drawings.

BRIEF DESCRIPTION OF THE DRAWINGS

FIG. 1 illustrates a block configuration of a control system of an image forming apparatus.

FIG. 7 is a flowchart illustrating processing for controlling execution of the UCR processing.

FIG. 8 illustrates a configuration of the color processing unit.

FIG. 9 is a drawing for describing the UCR processing.

DESCRIPTION OF THE EMBODIMENTS

Figure 2:
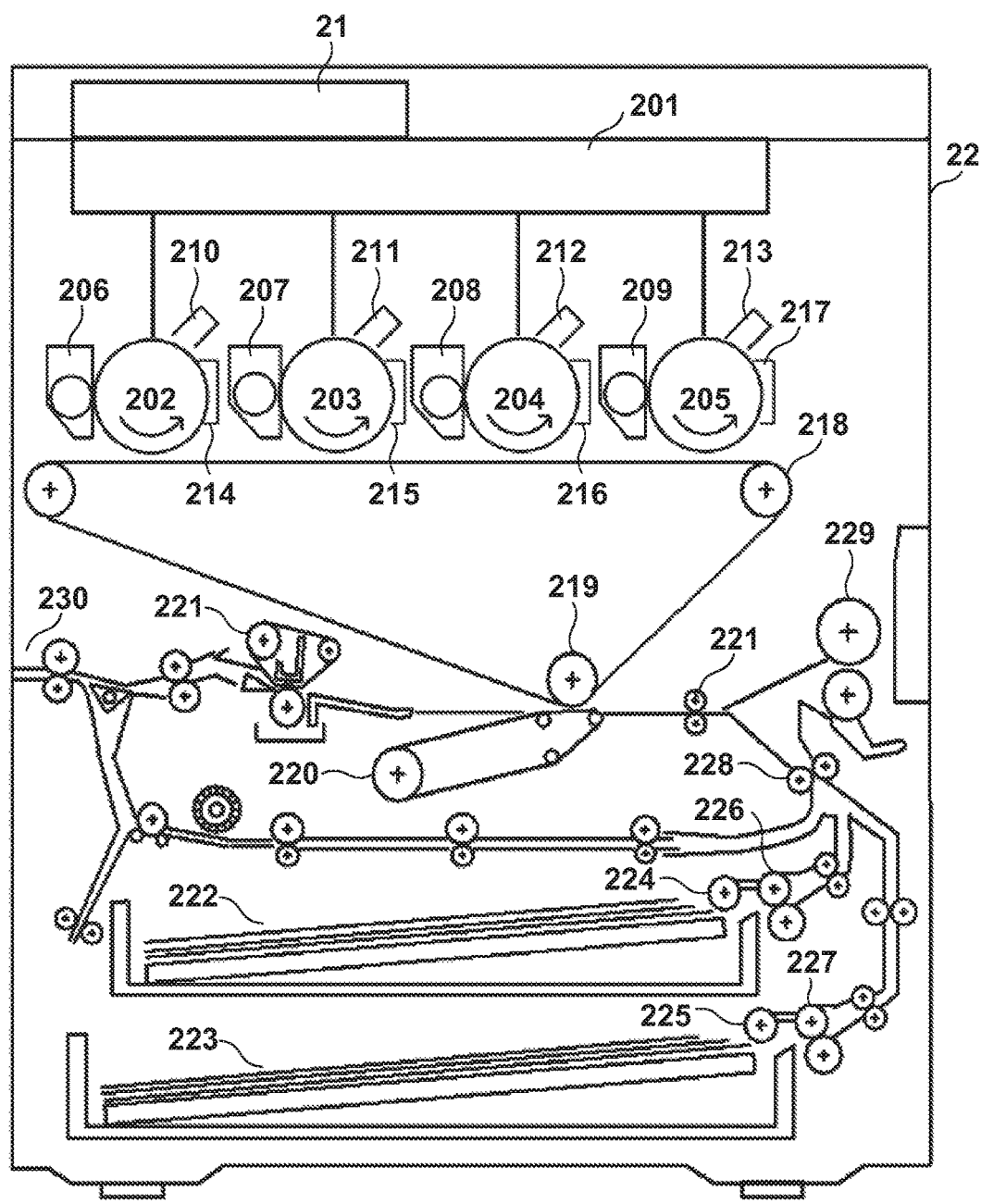
FIG. 2 illustrates an overview configuration of the image forming apparatus.

Preferred embodiments of the present invention will now be described hereafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to equivalent configuration elements, and a duplicate description thereof is omitted.

First Embodiment

FIG. 1 illustrates a configuration of a control system of an image forming apparatus 100 in the present embodiment. In the present embodiment, the image forming apparatus 100 is a multi-function peripheral (MFP) in which a plurality of functions, such as a print function, a scanning function, or a transmission function, for example, are integrated.

FIG. 1 illustrates a configuration of a control system (controller), of the image forming apparatus 100, relating to the present embodiment. The image forming apparatus 100 is connected communicably together with an external host computer 1 via a network, such as a local area network (LAN). The host computer 1 is an information processing apparatus, such as general-purpose personal computer (PC) or work station, and an image or a document generated by an application of the host computer 1 is converted into page description language (PDL) data by a driver, and is transmitted to the image forming apparatus 100. Here, PDL is a program language for specifying how characters or graphics are arranged in relation to a "page", which is a target of printing or display. A function that the image forming apparatus 100 can execute, such as a print function, for example, is executed with respect to PDL data transmitted to the image forming apparatus 100.

A central processing unit (CPU) 102 controls each block connected to a system bus 107 and comprehensively controls the entirety of the image forming apparatus 100. A read only memory (ROM) 104 is a general-purpose ROM and stores programs, data, tables, or the like, necessary for operation of the image forming apparatus 100. Each piece of software, such as an application and a program that describes processing of each flowchart described later, is stored in the ROM 104. A random-access memory (RAM) 103 is a general-purpose RAM and is used as a working memory of the CPU 102, for example. Operation of the present embodiment is realized by the CPU 102 reading a program stored in the ROM 104 to the RAM 103 and executing the program, for example.

A communication interface (I/F) unit 101 is configured to be able to communicate between the image forming apparatus 100 and an external network and to be compatible with a standard, such as Ethernet®, a serial interface, or a parallel interface, for example. The communication I/F unit 101 has a configuration that supports a network medium, such as wired or wireless, and may also be capable of communication with a mobile terminal that is at a close proximity, or the like, by having a communication configuration that supports a short-range wireless communication, such as Near Field Communication (NFC), for example.

An image processing unit 105 executes image processes, such as an enlargement/reduction, a rotation, a correction, or a color space conversion, with respect to data obtained from the outside or data obtained by optically scanning an original by a scanner in a case in which the image forming apparatus 100 has a scanning function. Although one image processing unit 105 is illustrated in FIG. 1, there are also cases in which a plurality of image processing units 105 are configured.

An engine I/F 106 is an interface to a device, such as a printer or a scanner. Although the engine I/F 106 is illustrated as an interface with only a print engine 108 in FIG. 1, it may be configured as an interface to a scan engine. The print engine 108 has a configuration that supports various methods of printing on a printing medium, such as an ink-jet printing method or an electrophotographic method.

Print target image data received from the host computer 1 is converted to rasterized print data, for example, in the image processing unit 105, and is output to the print engine 108. Then, the print engine 108 forms an image on a printing medium based on the output print data.

The communication I/F unit 101, the CPU 102, the RAM 103, the ROM 104, the image processing unit 105, and the engine I/F 106 are connected together via the system bus 107, and are configured as a controller 109. Note, some of the blocks illustrated in FIG. 1 may be configured by an application specific integrated circuit (ASIC) for example.

In FIG. 1, other blocks are appropriately configured according to executable functions of the image forming apparatus 100. For example, there also exist cases in which an auto document feeder (ADF), which feeds a plurality of originals consecutively to an image reading position one sheet at a time, is connected. Also, the image forming apparatus 100 has an operation unit (not shown) on which a touch panel, hard keys, a light emitting diode (LED), or the like are arranged, and the image forming apparatus 100 is capable of receiving an instruction for execution of a print function, a scan function, or the like, from a user. A function setting, a processing status of a job, or various user interface screens are displayed on a panel of the operation unit.

The controller 109 receives image data targeted for printing, performs rasterizing on the image data, and generates attribute data and image data thereof in units of pixels. The rasterized image data holds a color space of a plurality of color components, such as RGB or CMYK, and has a value of eight bits (256 tones) per one color component for each pixel. Also, attribute data holds a value representing an attribute, such as an image, a graphic, lines, or characters of an object, and is processed within the image processing unit 105 together with the image data.

Next, a description is given regarding the image forming apparatus 100 in a case in which the print engine 108 is configured by an electrophotographic method. FIG. 2 is a view illustrating a configuration of a print engine 22. Photosensitive drums 202, 203, 204, and 205 are rotated in direction, indicated by an arrow, each serving as an image carrier within the image forming apparatus 100. Facing the outer circumferential surface of the photosensitive drums 202, 203, 204, and 205, primary chargers 210, 211, 212, and 213, an exposure control unit 201, and developing apparatuses 206, 207, 208, and 209 are arranged in this rotation direction.

The primary chargers 210, 211, 212, and 213 provide an equal amount of electrical charge to the front surfaces of the photosensitive drums 202, 203, 204, and 205. Next, by the exposure control unit 201, a light beam, such as a laser beam modulated in accordance with a print image signal, is caused to be exposed on the photosensitive drums 202, 203, 204, and 205 to form an electrostatic latent image. Additionally, an electrostatic latent image is visualized by the developing apparatuses 206, 207, 208, and 209 containing each of the four colors (YMCK) of developer (toner). On a downstream side of an image transfer region in which a visualized visible image is transferred to an intermediate transfer body, cleaning apparatuses 214, 215, 216, and 217 perform a cleaning operation of cleaning toner that is not transferred to the printing paper and that remains on the photosensitive drums 202, 203, 204, and 205. Image formation using the toners is sequentially performed by the process described above.

Meanwhile, a printing paper is picked up by a pick-up roller 224 or 225 from an upper cassette 222 or a lower cassette 223, respectively, and is fed by a paper feed roller 226 or 227, respectively. Fed printing paper is conveyed to a registration roller 221 by a conveyance roller 228. Also, the printing paper is conveyed between an intermediate transfer body 219 and a transfer belt 220 at a timing at which a transfer to the intermediate transfer body 219 finishes. After this, the printing paper is conveyed by the transfer belt 220 and is pressure bonded to the intermediate transfer body 219, and a toner image is transferred to the printing paper by the intermediate transfer body 219. The toner image transferred to the printing paper is fixed on the printing paper by heat and pressure being applied by a fixing roller and a pressure roller 221. The printing paper on which an image is fixed is discharged to a face up paper discharge orifice 230.

Figure 3:
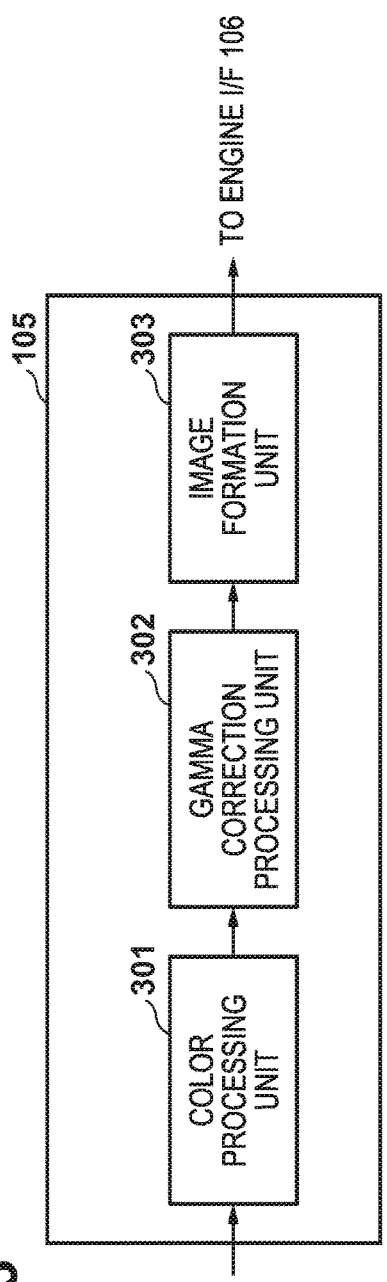
FIG. 3 illustrates a configuration of an image processing unit.

Next, a description is given regarding a configuration of the image processing unit 105. The image processing unit 105 includes a color processing unit 301, a gamma correction processing unit 302, and an image forming unit 303, as illustrated in FIG. 3. PDL data received from the host computer 1 is input to the controller 109 via the communication I/F unit 101. The CPU 102 converts the input PDL data into raster data and controls so as to store the converted image data in the RAM 103. Note, the image data stored in the RAM 103 is RGB data in which each pixel has RGB color components. The color processing unit 301 executes color conversion and UCR processing with respect to the image data stored in the RAM 103. The gamma correction processing unit 302 uses a one dimensional lookup table (LUT) to execute gamma correction processing for correcting the input image data so that a density characteristic of the image, when the image is transferred to the printing paper, becomes a desired density characteristic. In the present embodiment, a one dimensional LUT whose input value is output unchanged as an output value is used, for example. The CPU 102 performs, in accordance with a change of a state of the print engine 108, a rewrite of the one dimensional LUT, however, so that the output prior to the state of the print engine 108 being changed is the same as the output value after the change with respect to the same input value, as appropriate. The image forming unit 303 executes screen processing on the input image data so that the print engine 108 can transfer the image to printing paper. By this arrangement, the input image is converted into an image represented by a sparse density of dots of the four colors of CMYK.

Figure 4:
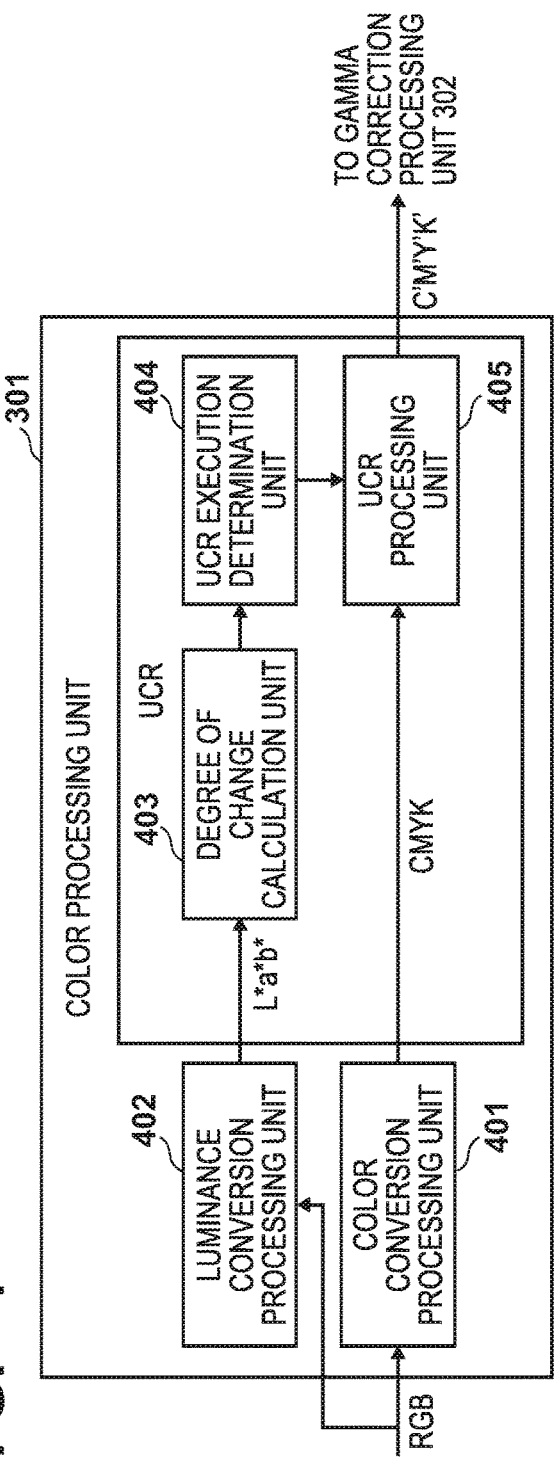
FIG. 4 illustrates a configuration of a color processing unit.

Next, a description is given regarding a configuration of the color processing unit 301. The color processing unit 301 includes a color conversion processing unit 401, a luminance conversion processing unit 402, a degree of change calculation unit 403, a UCR execution determination unit 404, and a UCR processing unit 405 as illustrated in FIG. 4. The color conversion processing unit 401 converts an RGB signal into a CMYK color space of density comprising four image signals by a color conversion LUT or a matrix operation. By this arrangement, the UCR processing unit 405 becomes able to execute UCR processing on a target pixel, and also the print engine 108 becomes capable of transferring an image to printing paper.

The luminance conversion processing unit 402 converts the input RGB signal value to a signal value of an L*a*b* space. The luminance conversion processing unit 402 determines whether a reference pixel is chromatic or achromatic from a luminance value L obtained in the conversion. Then, the luminance conversion processing unit 402 outputs the luminance value L of a target pixel to the degree of change calculation unit 403 in a case in which the target pixel is determined to be achromatic. The degree of change calculation unit 403 calculates, from an image signal value (pixel value) of the target pixel and an image signal value of pixels in the periphery, a degree of change of the image signal value of the target pixel. Here, the degree of change that the degree of change calculation unit 403 calculated is an evaluation value representing how much a pixel value changed by comparing a target pixel with the peripheral pixels, and is a luminance value for example. A description regarding a method of calculating a degree of change performed by the degree of change calculation unit 403 is given later.

The UCR execution determination unit 404 receives the degree of change of the target pixel from the degree of change calculation unit 403 and uses the received degree of change to determine whether or not the UCR processing will be executed on the target pixel. In the present embodiment, the UCR execution determination unit 404 compares a threshold predetermined by the CPU 102 with the degree of change that the degree of change calculation unit 403 calculated to perform a determination of whether or not to execute the UCR processing. Specifically, the UCR execution determination unit 404 performs determination that the UCR processing will not be executed in a case in which the degree of change is greater than the threshold, and, in contrast, that the UCR processing will be executed in a case in which the degree of change is less than the threshold. This is because the greater the value of the degree of change, the more likely a target pixel is in a region in which image quality is important, such as in a natural image, since the degree of change represents how much the target pixel differs from its peripheral pixels. Accordingly, the UCR execution determination unit 404 performs a determination so that the UCR processing will not be executed on a region in which the degree of change of the pixel value is large, and so that the UCR processing will be executed only on a region in which the degree of change of the pixel value is small, such as a solid color. The UCR processing unit 405 receives a UCR execution determination result for the target pixel from the UCR execution determination unit 404, and executes the UCR processing on the target pixel in a case in which it is determined that the UCR processing will be executed. Meanwhile, the UCR processing unit 405 does not execute the UCR processing in a case in which it is determined that the UCR processing will not be executed.

For example, the above threshold may be obtained together with the image data. It can be considered that degrees of change tend to differ depending on a scene, such as a "landscape" scene or an "everyday" scene, in a case of image data, such as a photograph. For example, it can be considered that the degree of change of a "scenery" scene tends to be greater than the degree of change of an "everyday" scene. Accordingly, if it is image data representing a photograph, for example, in an application of the host computer 1, by analyzing a feature amount of the image data (a number of faces, for example), a scene classification is performed, a threshold corresponding to the scene is set, and the threshold is transmitted to the image forming apparatus 100. A configuration may also be taken such that the color processing unit 301 of the image forming apparatus 100 uses a threshold corresponding to the image data.

Figure 5:
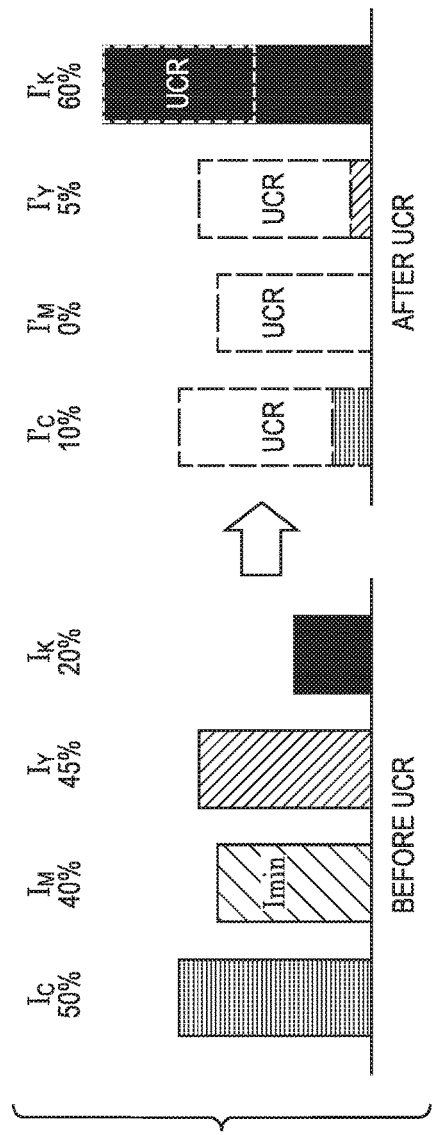
FIG. 5 is a drawing for describing UCR processing.

Next, a description is given regarding the UCR processing that the UCR processing unit 405 performs with reference to FIG. 5. FIG. 5 illustrates one example of the UCR processing that the UCR processing unit 405 performs.

The UCR processing is image processing for reducing the total image signal value of a target pixel by decreasing the image signal values of specific colors, the three colors of CMY for example, and increasing the image signal value of K with respect to an achromatic target pixel that includes the four image signals CMYK.

First, a minimum image signal value $I_{min}$ is calculated from among three image signal values $I_C(x, y)$, $I_M(x, y)$, and $I_Y(x, y)$ of C, M, and Y, respectively, of the target pixel according to Equation (1):

$$I_{min} = \text{Min}(I_C(x,y), I_M(x,y), I_Y(x,y)) \quad (1).$$

Also, the calculated value of $I_{min}$ is a UCR amount (UCR) representing an amount of a reduction of the CMY signal amounts and an amount of an increase of the K signal value at a time of UCR processing according to Equation (2):

$$UCR = I_{min} \quad (2).$$

Also, a signal value $I'_{C,M,Y,K}(x, y)$ for which the UCR signal amount is subtracted from each signal value of C, M, and Y, and the signal value of K is increased by the UCR amount, is output according to Equations (3) and (4):

$$I'_{C,M,Y} = I_{C,M,Y}(x,y) - UCR \quad (3), \text{ and}$$

$$I'_K = I_K(x,y) + UCR \quad (4).$$

By this arrangement, the total image signal value of the target pixel is reduced by 2 UCR amounts and the amount of toner applied to the printing medium is also reduced.

FIG. 5 illustrates an example in which the UCR processing is executed on an image signal of (C, M, Y, K)=(50%, 40%, 45%, 20%). At this time, the minimum value in the C, M, Y image signal is the M image signal, and so $I_{min}=40\%$ and UCR=40%. Accordingly, the image signal values of the target pixel after the UCR processing becomes (C', M', Y', K')=(10%, 0%, 5%, 60%).

A description is given regarding a degree of change that the degree of change calculation unit 403 calculates. Generally, for an image of an image attribute in which image quality is emphasized, such as a photograph, a pixel value of each pixel is not fixed and changes finely. For this reason, pixel values of a target pixel and the peripheral pixels are compared, and, if there is variation, it is determined that the target pixel is in an image region in which image quality should be emphasized. In the present embodiment, the target pixel and the peripheral pixels are compared, and it is determined whether or not the target pixel is in a region in which image quality should be emphasized based on the evaluation value, specifically the degree of change, which represents how much the pixel value changed.

Figure 6:
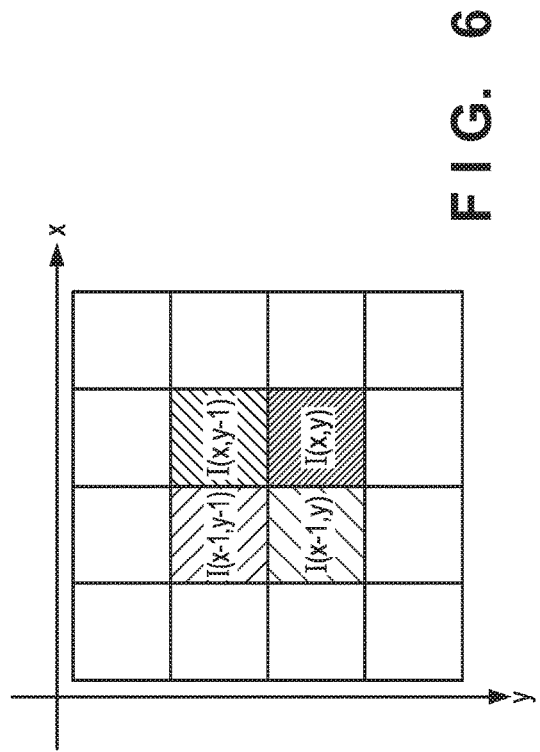
FIG. 6 is a drawing for describing a degree of change of a pixel value.

Using FIG. 6, a description is given regarding a method of calculating the previously described degree of change, which is reference value. FIG. 6 is a view representing a positional relationship of a target pixel I(x, y) and adjacent pixels. The degree of change is calculated from the pixel values of the input image data. In the present embodiment, although the degree of change is calculated by using a luminance value (L) of an L*a*b* space, the pixel value used for calculating the degree of change may be an RGB signal value and may be a CMYK signal value.

First, an average I'(x, y) of the absolute values of the differences between the target pixel and the adjacent pixels is calculated in an x direction and a y direction. An average difference in the x direction is calculated in Equation (5) from the target pixel and the adjacent pixels I(x, y), I(x−1, y), and I(x−1, y−1):

$$I'_x(x,y)=\tfrac{1}{2}(|I(x,y)-I(x-1,y)|+|I(x,y)-I(x-1,y-1)|) \quad (5).$$

Similarly, an average difference in the y direction is calculated in Equation (6) from the target pixel and the adjacent pixels I(x, y), I(x, y−1), and I(x−1, y−1):

$$I'_y(x,y)=\tfrac{1}{2}(|I(x,y)-I(x,y-1)|+|I(x,y)-I(x-1,y-1)|) \quad (6).$$

Next, degrees of change $I'_{xdeg}$ and $I'_{ydeg}$ of the x direction and y direction of the target pixel I(x, y) are calculated from Equations (7) and (8). In the present embodiment, the degree of change is defined as the arithmetic mean of the previously described average difference of the target pixel in each direction and the peripheral pixels and the degrees of change of the adjacent pixels I(x−1, y) and I(x, y−1). It is possible to calculate not only the degree of change from the adjacent pixels but also the degree of change in the image in a wide area by making the degree of change of the target pixel a recursive form in which the arithmetic mean of the degrees of change of the peripheral pixels calculated previously is obtained.

$$I'_{xdeg}=\alpha I'_x(x,y)+\beta I'_{xdeg}(x-1,y)+\gamma I'_{xdeg}(x,y-1) \quad (7), \text{ and}$$

$$I'_{ydeg}=\alpha I'_y(x,y)+\beta I'_{ydeg}(x-1,y)+\gamma I'_{ydeg}(x,y-1) \quad (8).$$

Note, the coefficients α, β, and γ of the weighted addition are positive values and are set so that α+β+γ=1. Also, the greater of the degree of change values, out of the degree of change values in the x direction and the y direction, is made to be the degree of change I'$_{deg}$(x, y) used for UCR execution determination for the target pixel I(x, y). The degree of change I'$_{deg}$(x, y) is calculated from Equation (9). If the degree of change, of the greater of the values out of the degrees of change of the x direction and the y direction, falls below the threshold when the UCR execution determination is performed in the UCR execution determination unit 404, it is determined that the pixel is a target of the execution of the UCR processing.

$$I'_{deg}(x,y)=\mathrm{Max}(I'_{xdeg},I'_{ydeg}) \quad (9).$$

Note, the Max function is a function that outputs a maximum value from among a plurality of input values. In the present embodiment, the degree of change of the greater of the values among the x direction and the y direction is made to be the degree of change of the target pixel. The degree of change of the target pixel may, however, additionally be defined as the root mean square of the degrees of change of each direction of the target pixel by taking the degree of change as a vector.

Also, the degree of change calculation unit 403 outputs the calculated degree of change to the UCR execution determination unit 404. A comparison between the input degree of change and the threshold for UCR execution determination set by the CPU 102 is performed in the UCR execution determination unit 404. In a case in which the degree of change is greater than the threshold, it is determined that the reference pixel is in a region in which image quality should be emphasized, and it is determined that the UCR processing will not be executed. Meanwhile, in a case in which the degree of change is less than the threshold, it is determined that the UCR processing will be executed. Then, in the case in which it is determined that the UCR processing will not be executed, the UCR execution determination unit 404 outputs a determination result that the UCR processing is not to be executed to the UCR processing unit 405. In the case in which it is determined that the UCR processing will be executed, the UCR execution determination unit 404 outputs a determination result that the UCR processing is to be executed to the UCR processing unit 405.

FIG. 7 is a flowchart illustrating processing for controlling the execution of the UCR processing performed by the color processing unit 301 in the present embodiment. The processing of FIG. 7 is realized by the CPU 102 reading a program stored in the ROM 104 to the RAM 103 and executing the program, for example.

First, the degree of change calculation unit 403 obtains the pixel value of the target pixel of the image data input from the RAM 103 in step S701. The degree of change calculation unit 403 uses the pixel value of the obtained target pixel and the pixel values of the adjacent pixels of the target pixel to calculate the degree of change of the target pixel in step S702. The degree of change of the target pixel is ultimately calculated from Equation (9).

The UCR execution determination unit 404 compares the degree of change of the target pixel calculated in step S702 with the threshold for the UCR execution determination in step S703. Here, in a case in which the degree of change is a value greater than the threshold, the UCR execution determination unit 404 determines that the UCR processing will not be executed and outputs this determination result to the UCR processing unit 405, and the process advances to step S705. On the other hand, in a case in which the degree of change is a value less than or equal to the threshold, the UCR execution determination unit 404 determines that the UCR processing will be executed and outputs this determination result to the UCR processing unit 405, and the process advances to step S704.

In step S704, the UCR processing unit 405 executes the UCR processing on the target pixel in accordance with the UCR execution determination result input from the UCR execution determination unit 404. The UCR processing unit 405 executes the UCR processing on the target pixel and outputs an obtained image signal to the gamma correction processing unit 302 in step S705. The color processing unit 301 determines whether or not the execution determination of the UCR processing has been performed on all of the pixels of the input image data in step S706. In a case in which it is determined that the execution determination of the UCR processing has been performed on all pixels, the processing of FIG. 7 finishes. Meanwhile, in a case in which it is determined that the execution determination of the UCR processing has not yet been performed on all pixels, the processing from step S701 repeats.

As described above, by virtue of the present embodiment, it becomes possible to reduce a usage amount of toner by executing UCR processing on a region in which a degree of change is small while maintaining image quality by not executing the UCR processing on a region in which a degree of change is large and image quality is emphasized.

Second Embodiment

Hereafter, a description will be given regarding a second embodiment. In the first embodiment, a level at which a pixel value of a target pixel changes in relation to peripheral pixels, specifically a degree of change, is calculated and it is determined whether or not UCR processing will be executed on the target pixel based on the calculation result. There exist cases, however, in which, in an image region, such as a gradation from a chromatic color using CMY toward a solid region of an achromatic color of CMYK, for example, a tint between adjacent pixels changes when the UCR processing is performed and not performed in the solid region and the gradation region.

As an example of such a case, when image data is generated by an application of the host computer 1, for example, an attribute, such as an image or a graphic, is determined at the time of this generation. In a case of graphic data including a gradation, the gradation region is imaged by the application. In such a case, the tint between adjacent pixels changes and looks like a frame when it changes whether the UCR processing is performed and not performed in the solid region and the gradation region.

Accordingly, in the present embodiment, the CMY signal amount that is subtracted and the K signal amount that is increased when the UCR processing is executed, specifically the UCR amount, is determined in accordance with the degree of change of the target pixel. By this arrangement, it becomes possible to reduce the usage amount of a printing material within a gradation, and it is also possible to suppress a difference of a tint between a solid region and a gradation region by gradually increasing the UCR amount, and, therefore, it is possible to suppress a tint change. Hereafter, a description will be given of points that differ from the first embodiment.

FIG. 8 is a view illustrating a configuration of the color processing unit 301 in the present embodiment. The color processing unit 301 includes the color conversion processing unit 401, the degree of change calculation unit 403, the UCR execution determination unit 404, the UCR processing unit 405, and a UCR reduction percentage (rate) calculation unit 406, as illustrated in FIG. 8. The color conversion processing unit 401 converts an RGB signal into a CMYK color space comprising four image signals by a color conversion LUT or a matrix operation. The degree of change calculation unit 403 calculates, from an image signal value of the target pixel and an image signal value of pixels in the periphery, a degree of change. The UCR execution determination unit 404 receives the degree of change of the target pixel from the degree of change calculation unit 403, and, based on the received degree of change, determines whether or not the UCR processing will be executed on the target pixel.

The UCR reduction percentage calculation unit 406 calculates a UCR reduction percentage used for the UCR processing unit 405 to determine a UCR amount in a case in which it receives from the UCR execution determination unit 404 a determination result that the UCR processing will be executed. At this time, the UCR reduction percentage calculation unit 406 calculates the UCR reduction percentage based on the degree of change of the target pixel calculated by the degree of change calculation unit 403. A description is given later regarding a detailed calculation method. The UCR reduction percentage calculation unit 406 outputs the calculated UCR reduction percentage to the UCR processing unit 405. The UCR processing unit 405 receives the UCR execution determination result for the target pixel from the UCR execution determination unit 404 and receives the UCR reduction percentage from the UCR reduction percentage calculation unit 406. Then, in a case in which a determination result is that the UCR processing will be executed, the UCR processing unit 405 determines a UCR amount based on the input UCR reduction percentage to execute the UCR processing on the target pixel.

A description is given regarding a method of calculating the UCR reduction percentage performed by the UCR reduction percentage calculation unit 406 with reference to FIG. 9. FIG. 9 illustrates one example of UCR processing in which a UCR reduction percentage that the UCR reduction percentage calculation unit 406 output is used by the UCR processing unit 405. As described previously, in a case of a graphic including a change, such as a gradation toward an achromatic color, there are cases in which whether or not the UCR processing is performed switches at a boundary of a solid region and a gradation region, and the tint changes. Accordingly, in the present embodiment, in accordance with the change amount, the UCR amount is caused to change depending on the adjustment amount for adjusting the UCR amount, which is the UCR reduction percentage. Also, by causing the UCR amount to gradually increase in a direction from the gradation region to the solid region, it is possible to execute the UCR processing while suppressing a sharp change in tint at a boundary of the solid region and the gradation region.

In the present embodiment, the UCR reduction percentage calculation unit 406 calculates a UCR reduction percentage RUCR at a time of execution of UCR processing. Also, the UCR amount used by the UCR processing unit 405 is determined based on the UCR reduction percentage.

In the present embodiment, the UCR amount used by the UCR processing unit 405 is calculated from Equation (10):

$$UCR = R_{UCR} * I_{min} \quad (10).$$

Then, a reduction percentage RUCR is calculated from Equation (11) in the UCR reduction percentage calculation unit 406:

$$R_{UCR} = (TH - I'_{deg}(x,y))/TH \quad (11).$$

Here, TH represents the value of the threshold of the determination of execution of the UCR processing used by the UCR execution determination unit 404. By setting the UCR amount as described above, the UCR amount is changed so as to increase the smaller the degree of change becomes, and the UCR amount becomes a maximum when the degree of change becomes zero, specifically when the region becomes a solid color. Note, because TH is the threshold of the determination of execution of the UCR processing, it is not necessary to consider a case in which $I'_{deg}(x, y)$ is greater than TH in Equation (11) because the UCR processing is not executed if $I'_{deg}(x, y)$ is greater than TH.

As described above, in the present embodiment, a gradual adjustment of the UCR amount in a gradation region is possible by introducing the UCR reduction percentage, specifically, a parameter representing a degree of adjustment of the UCR amount.

FIG. 9 is a view illustrating an example of UCR processing of a case in which the threshold TH=4 is set and a degree of change of a target pixel is I'(x, y)=1. In the case of FIG. 9, it is determined that the UCR processing is executed because the degree of change is less than or equal to the threshold. FIG. 9 illustrates an example in which the UCR processing is executed on an image signal of (C, M, Y, K)=(50%, 40%, 45%, 20%). At this time, the minimum value in the C, M, Y image signal is the M image signal, and so $I_{min}$=40%. From the obtained Imin, the threshold TH, and a degree of change $I'_{deg}(x, y)$, the UCR reduction percentage is calculated to be $R_{UCR}$=0.75 from Equation (11). For this reason, the UCR amount is calculated to be UCR=40× 0.75=30 from Equation (10). Accordingly, the pixel value of the target pixel after the UCR processing becomes (C', M', Y', K')=(20%, 10%, 15%, 50%) because the signal amount for each of the colors of CMY is reduced by 30% and the signal value of K increases by 30%.

Figure 10:
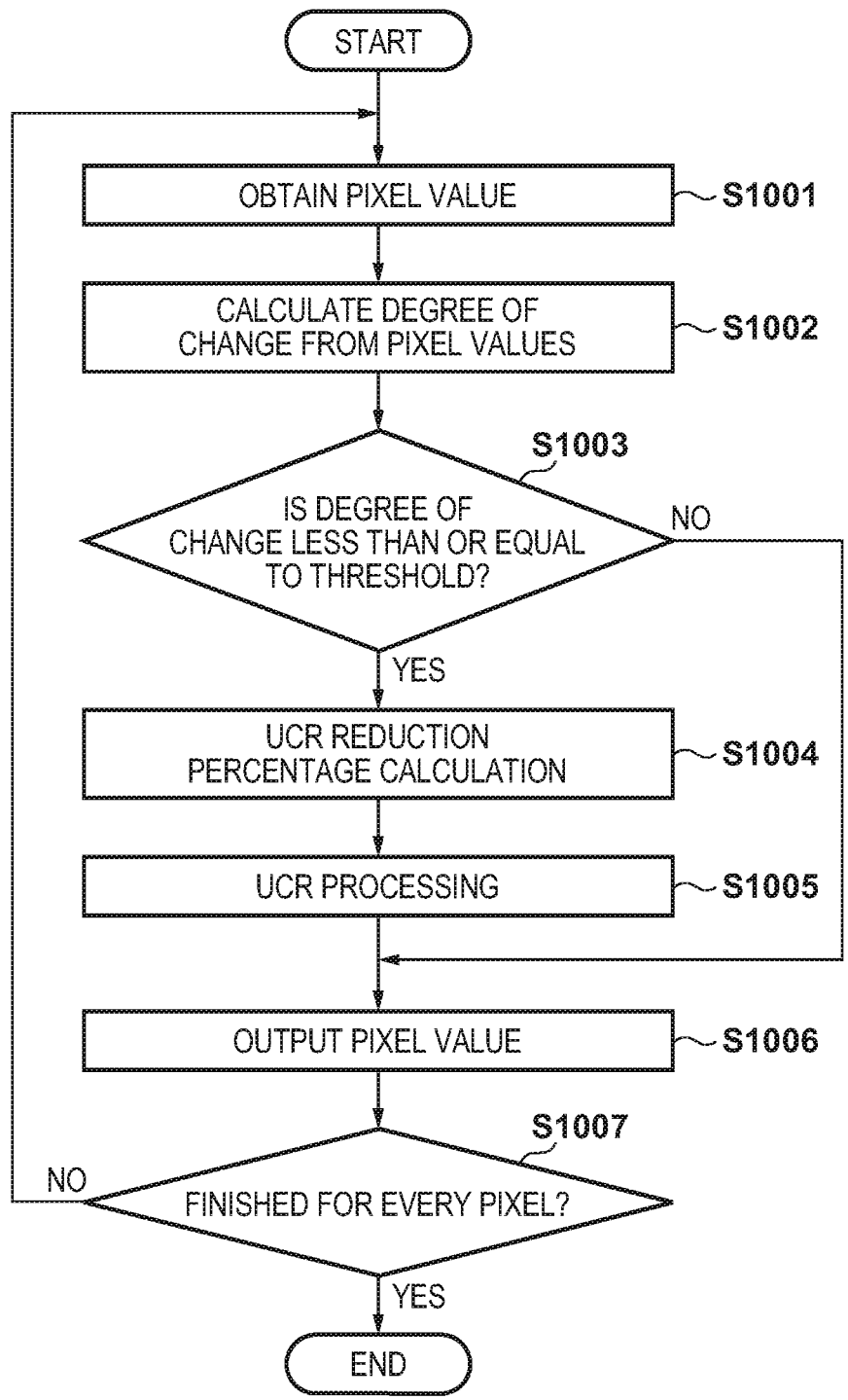
FIG. 10 is a flowchart illustrating processing for controlling execution of the UCR processing.

FIG. 10 is a flowchart illustrating processing for controlling the execution of the UCR processing performed by the color processing unit 301 in the present embodiment. The processing of FIG. 10 is realized by the CPU 102 reading a program stored in the ROM 104 to the RAM 103 and executing it for example.

First, the degree of change calculation unit 403 obtains the pixel value of the target pixel of the image data input from the RAM 103 in step S1001. The degree of change calculation unit 403 uses the pixel value of the obtained target pixel and the pixel values of the adjacent pixels of the target pixel to calculate the degree of change of the target pixel in step S1002. The degree of change of the target pixel is ultimately calculated from Equation (9).

The UCR execution determination unit 404 compares the degree of change of the target pixel calculated in step S1002 with the threshold for the UCR execution determination in step S1003. Here, in a case in which the degree of change is a value greater than the threshold, the UCR execution determination unit 404 determines that the UCR processing will not be executed and outputs this determination result to the UCR processing unit 405 and the UCR reduction percentage calculation unit 406, and the process advances to step S1006. Meanwhile, in a case in which the degree of change is a value less than or equal to the threshold, the UCR execution determination unit 404 determines that the UCR processing is executed, outputs the determination result and the degree of change to the UCR processing unit 405 and the UCR reduction percentage calculation unit 406, and the process advances to step S1004.

In step S1004, when the UCR reduction percentage calculation unit 406 inputs the determination result and the degree of change from the UCR execution determination unit 404, it calculates a UCR reduction percentage based on the degree of change and outputs it to the UCR processing unit 405. The UCR reduction percentage is calculated by Equation (11).

In step S1005, the UCR processing unit 405 executes the UCR processing on the target pixel in accordance with the UCR execution determination result input from the UCR execution determination unit 404. At this time, the UCR processing unit 405 determines, based on the UCR reduction percentage input from the UCR reduction percentage calculation unit 406, a UCR amount used for the UCR processing. The determination of this UCR amount is calculated and determined by Equation (10).

In step S1006, the UCR processing unit 405 executes the UCR processing on the target pixel and outputs an obtained image signal to the gamma correction processing unit 302. In step S1007, the color processing unit 301 determines whether or not the execution determination of the UCR processing has been performed on all of the pixels of the input image data. In a case in which it is determined that the execution determination of the UCR processing has been performed on all pixels, the processing of FIG. 10 finishes. Meanwhile, in a case in which it is determined that the execution determination of the UCR processing has not yet been performed on all pixels, the processing from step S1001 repeats.

As described above, by virtue of the present embodiment, even if a gradation region toward a solid region exists, it is possible to prevent a change of a tint due to a switch of whether or not UCR processing is executed arising.

Third Embodiment

In the first and second embodiments, the UCR execution determination unit 404 performing a determination of execution of UCR processing by using a degree of change as an evaluation value is described. The evaluation value used for determination of execution of UCR processing is not, however, limited to a degree of change. For example, in addition to the degree of change of the target pixel, the luminance value of the target pixel may be referred to and made to be the evaluation value of the determination of an execution of the UCR processing. Also, a configuration may also be taken such that it is determined that the UCR processing is executed in a case in which a degree of change is less than a threshold for comparing degree of change and in which the luminance value of a target pixel is also less than a threshold for comparing luminance. By this arrangement, even in a case in which a degree of change is sufficiently small, it is possible to emphasize image quality by not executing UCR processing on an image region of high luminance, specifically, a bright image region. Meanwhile, in a case in which a degree of change is sufficiently small, it becomes possible to reduce a usage amount of toner by executing UCR processing on an achromatic region whose luminance is low.

OTHER EMBODIMENTS

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus for printing an image on a printing medium based on image data, the image forming apparatus comprising:
    (A) a memory that stores instructions;
    (B) at least one processor that executes the instructions to function as:
        (a) an image processing unit configured to execute, with respect to image data, image processing that adjusts an amount of a printing material to be applied to the printing medium;
        (b) a calculation unit configured to calculate an amount of change of pixel values between a target pixel and a peripheral pixel that is adjacent to the target pixel; and
        (c) a control unit configured to control whether to execute the image processing for the target pixel based on the calculated amount of change of pixel values; and
    (C) a printing unit configured to print the image on the printing medium based on image data resulting from the control of execution of the image processing by the control unit.

2. The image forming apparatus according to claim 1, wherein the control unit does not execute the image processing for the target pixel if the calculated amount of change is greater than a threshold value, and does execute the image processing for the target pixel if the calculated amount of change is less than or equal to the threshold value.

3. The image forming apparatus according to claim 2, wherein the at least one processor further executes the instructions to function as (d) a determination unit configured to determine whether or not the amount of change is greater than the threshold, wherein the control unit controls whether to execute the image processing for the target pixel based on a result of the determination by the determination unit.

4. The image forming apparatus according to claim 1, wherein, in a case in which the image processing is executed, the control unit determines, based on the calculated amount of change, a parameter that represents a degree of adjustment of an amount of the printing material to be applied, and executes the image processing based on the determined parameter.

5. The image forming apparatus according to claim 4, wherein the control unit determines the parameter such that, the greater the calculated amount of change the smaller the parameter, and the smaller the calculated amount of change, the greater the parameter.

6. The image forming apparatus according to claim 5, wherein the image processing is under color removal (UCR) processing, and the control unit changes an amount to reduce or to increase the printing material, such that, the lesser the parameter, the lesser the amount to reduce or to increase, and, the greater the parameter, the greater the amount to reduce or to increase.

7. The image forming apparatus according to claim 1, wherein the pixel value includes a luminance value.

8. The image forming apparatus according to claim 1, wherein the image processing unit executes the image processing with respect to the image data which is red green blue (RGB) data.

9. A control method that is executed in an image forming apparatus for printing an image on a printing medium based on image data, the control method comprising:
    executing, with respect to image data, image processing that adjusts an amount of a printing material to be applied to the printing medium;
    calculating an amount of change of pixel values between a target pixel and a peripheral pixel that is adjacent to the target pixel;
    controlling whether to execute the image processing for the target pixel based on the calculated amount of change of pixel values; and
    printing the image on the printing medium based on image data resulting from the control of execution of the image processing.

10. A non-transitory computer-readable storage medium storing a program for causing a computer:
    to execute, with respect to image data, image processing that adjusts an amount of a printing material to be applied to a printing medium;
    to calculate an amount of change of pixel values between a target pixel and a peripheral pixel that is adjacent to the target pixel;
    to control whether to execute the image processing for the target pixel based on the calculated amount of change of pixel values; and
    to print the image on the printing medium based on image data resulting from the control of execution of the image processing.

* * * * *